Patented Feb. 15, 1949

2,461,820

UNITED STATES PATENT OFFICE 2,461,820

CONVERSION OF ETHYLENE

Stanford J. Hetzel, Cheltenham, and Robert M. Kennedy, Drexel Hill, Pa., assignors to Sun Oil Company, Philadelphia, Pa., a corporation of New Jersey No Drawing. Application December 28, 1945, Serial No. 637,787

5 Claims. (Cl. 260—683.15)

This invention relates to the conversion of ethylene to higher boiling materials by subjecting it, together with a non-polymerizable hydrocarbon, to an elevated temperature in presence of a novel solid catalyst. Specifically, the invention relates to the conversion of mixtures of ethylene and a substantial proportion of ethane to higher boiling materials by subjecting such mixtures to an elevated temperature, in the presence of a novel solid catalyst consisting essentially of silica gel, alumina and nickel.

In Serial No. 625,693, filed October 30, 1945, now Patent 2,452,190, by the present inventors, there is described and claimed a process for the polymerization of a compound containing 2 carbon atoms and a double bond per molecule, specifically, ethylene, which comprises contacting said hydrocarbon under polymerizing conditions with a catalyst consisting essentially of silica gel, alumina and nickel. In that application it is pointed out that ethylene can be polymerized to higher boiling materials, specifically hydrocarbon products boiling within the motor fuel range, without formation of substantial quantities of undesired heavier fractions, employing operating pressures as low as 30 lbs./sq. in. This pressure is considerably lower than that heretofore deemed necessary for the polymerization of ethylene.

It has now been found that by subjecting ethylene, together with a non-polymerizable hydrocarbon, specifically ethane, to the action of a catalyst consisting essentially of silica gel, alumina and nickel at a temperature within the range 300° C.–500° C. and at a pressure within the range 30 lbs./sq. in.–150 lbs./sq. in., that greatly increased yields of higher boiling materials, based on the ethylene charged, can be obtained at the above mentioned low pressures. Thus it has been found, by the addition of substantial quantities of ethane, for example, within the range 20% to 80%, that yields up to 40%, based on the olefin charged, of desirable higher boiling products can be obtained.

When ethane was present, to the extent of 36% of the charge, passed into the conversion zone, the yield, based on ethylene charged was 38%—compared with a yield of 14% for pure ethylene. It is apparent that the ethane unquestionably takes some part in the conversion process. Thus, in one particular run employing a catalyst consisting essentially of 90% silica gel, 5% alumina and 5% nickel and a gas feed consisting of approximately 36% by weight of ethylene and 64% by weight of ethane, at 400° C. and 60 lbs./sq. in. pressure, at a charge rate of 4 grams/minute/100 grams catalyst, a yield of 38% of desirable higher boiling products was obtained, based on the ethylene charged. The following table shows some additional results obtained employing conditions and catalyst within the scope of the invention.

Conversion of ethane-ethylene mixtures at 400° C., 60 p. s. i.

| Catalyst Composition | | | Charge Composition | | Charge Rate [1] | Conversion, Weight Per Cent— | | Conversion, Weight Per Cent pure Ethylene |
|---|---|---|---|---|---|---|---|---|
| Per Cent Ni | Per Cent Al²O³ | Per Cent SiO² | Per Cent Ethane | Per Cent Ethylene | | of Charge | of Ethylene | |
| 5 | 5 | 90 | 27.4 | 72.6 | 3.2 | 26.0 | 35.8 | 16.0 |
| 5 | 5 | 90 | 63.5 | 36.5 | 3.7 | 14.5 | 40.8 | 14.5 |
| 5 | 5 | 90 | 53.6 | 46.4 | 2.9 | 10.0 | 21.6 | 17.5 |
| 2 | 2 | 96 | 22.7 | 77.3 | 3.5 | 27.0 | 34.9 | 28.0 |
| 2 | 2 | 96 | 51.2 | 48.8 | 4.3 | 28.5 | 58.3 | 26.5 |
| 2 | 2 | 96 | 27.4 | 72.6 | 4.4 | 28.0 | 38.5 | 26.5 |

[1] Gms. charged/min./100 gms. catalyst.

As stated, the catalyst consists essentially of silica gel, alumina and nickel. Preferably, the catalyst consists essentially of a major proportion of silica gel and relatively minor proportions of alumina and nickel, still more preferably the catalyst will consist essentially of not less than 70% silica gel, not more than 30% nickel and a substantially smaller but appreciable quantity of alumina. Thus, 80%–99% silica gel, ½%–10% alumina and ½%–10% nickel can be employed for good results. In the preparation of the catalyst composition silica gel, of desired particle size (4–8 mesh) is impregnated with aluminum nitrate and nickel nitrate solutions. The mass is evaporated to dryness, with stirring and then ignited to a temperature at about 300° C. for about 9 hours to convert the nitrates to their respective oxides. Prior to use the catalyst mass is charged into a catalyst tube and therein ignited for one hour with air at about 400° C. to ensure complete conversion to the oxides and to remove traces of water. It is then reduced with a slow stream of hydrogen for about 9 hours at 400° C. to convert the nickel oxide to nickel.

For starting materials in the preparation of the catalyst composition there may be employed any compound of aluminum, which upon ignition will yield alumina in activated form upon silica gel, and nickel compound, which will yield nickel oxide on ignition and which can be reduced substantially to nickel on the silica gel. For example, freshly precipitated aluminum hydroxide can be admixed with nickel hydroxide and added to silica gel and the whole ignited and reduced as set forth previously or, if desired, an aluminum compound and a nickel compound can be distributed on silica gel and the entire mass ignited in air followed by reduction of the ignited mass. Other methods of preparation, readily apparent to those versed in the art, can also be employed, the essence of the invention being, insofar as it relates to the catalyst, in the use of the specific combinations of materials as set forth.

In copending application Serial No. 625,692, filed October 30, 1945, by the present inventors, there is described and claimed a catalyst composition consisting by weight of 80%–99.98% silica gel, 0.01%–10% alumina and 0.01%–10% nickel. Also, in copending application Serial No. 625,694, filed October 30, 1945, now Patent 2,452,198 by the present inventors, there is described and claimed a process for the polymerization of olefins containing 3 or more carbon atoms per molecule employing a catalyst consisting by weight of 80%–99.98% silica gel, 0.01%–10% alumina and 0.01%–10% nickel.

While the catalyst has been described to contain silica gel, alumina and nickel, it is possible in some instances to substitute "chromia" for the alumina and "cobalt" for the nickel. These instances are the following: silica gel-alumina-cobalt; silica gel-chromia-nickel.

The period of activity of the catalyst will naturally vary depending upon the conditions of use. A practical conversion can be obtained for periods up to 5 hours without regeneration. The catalyst can be regenerated many times to substantially its original activity. After 75 regenerations, tests have shown that the activity is essentially unchanged.

The foregoing has been written for purposes of disclosure and it will be obvious to those versed in the art that wide variation and modification within the scope of the invention is possible for the conversion of mixtures of ethylene and non-polymerizable hydrocarbons, to desirable higher boiling products, for example, compounds suitable for further processing into a fuel for internal combustion engines, the essence of the invention being that mixtures of ethylene and a non-polymerizable hydrocarbon, specifically ethane, can be treated to give desirable higher boiling products in extremely good yields which are so very much greater than those heretofore obtained with ethylene, alone, as to amount to an absolutely unpredictable result.

We claim:

1. A process for the conversion of a mixture of ethylene and a substantial proportion of ethane to higher boiling materials by subjecting such mixture to an elevated temperature in the presence of a catalyst consisting by weight of not less than 70% silica gel, not more than 30% of a metal selected from the group consisting of nickel and cobalt and a substantially smaller but appreciable quantity of alumina.

2. A process for the conversion of a mixture of ethylene and a substantial proportion of ethane which comprises subjecting such mixture to an elevated temperature in presence of a catalyst consisting essentially of a major proportion of silica gel and relatively minor proportions of alumina and a metal selected from the group consisting of nickel and cobalt.

3. A process for the conversion of a mixture of ethylene and a substantial proportion of ethane which comprises subjecting such mixture to a temperature within the range 300° C.–500° C. and a pressure within the range 30 lbs./sq. in.–150 lbs./sq. in. in the presence of a catalyst consisting essentially of a major proportion of silica gel and relatively minor proportions of alumina and nickel.

4. A process for the conversion of a mixture of ethylene and a substantial proportion of ethane into higher boiling materials by subjecting such mixture to a temperature of about 400° C. and a pressure of about 60 lbs./sq. in. in the presence of a catalyst consisting essentially of about 90% silica gel, 5% alumina and 5% nickel.

5. A process according to claim 4 wherein the ethane in the gases to be converted is present in an amount within the range 20%–80%.

STANFORD J. HETZEL.
ROBERT M. KENNEDY.

REFERENCES CITED

The following references are of record in the file of this patent:

UNITED STATES PATENTS

| Number | Country | Date |
|---|---|---|
| 2,332,276 | Stahly | Oct. 19, 1943 |
| 2,380,358 | Anderson | July 10, 1945 |
| 2,381,198 | Bailey et al. | Aug. 7, 1945 |